United States Patent
Sun et al.

(10) Patent No.: US 12,468,897 B2
(45) Date of Patent: Nov. 11, 2025

(54) SELF-IMPROVING LLMS THROUGH CONSISTENCY-BASED SELF-GENERATED DEMONSTRATIONS

(71) Applicant: Google LLC, Mountain View, CA (US)

(72) Inventors: Ruoxi Sun, Santa Clara, CA (US); Xingchen Wan, Oxford (GB); Hanjun Dai, San Jose, CA (US); Sercan Omer Arik, San Francisco, CA (US); Tomas Pfister, Redwood Shores, CA (US)

(73) Assignee: Google LLC, Mountain View, CA (US)

( * ) Notice: Subject to any disclaimer, the term of this patent is extended or adjusted under 35 U.S.C. 154(b) by 356 days.

(21) Appl. No.: 18/128,450

(22) Filed: Mar. 30, 2023

(65) Prior Publication Data

US 2024/0249080 A1   Jul. 25, 2024

Related U.S. Application Data

(60) Provisional application No. 63/480,789, filed on Jan. 20, 2023.

(51) Int. Cl.
*G06F 40/40* (2020.01)
*G06F 16/334* (2025.01)

(52) U.S. Cl.
CPC .......... *G06F 40/40* (2020.01); *G06F 16/3344* (2019.01)

(58) Field of Classification Search
CPC ............................ G06F 40/40; G06F 16/3344
See application file for complete search history.

(56) References Cited

U.S. PATENT DOCUMENTS

2020/0311473 A1* 10/2020 Agarwal ............... G06F 18/214
2022/0027792 A1* 1/2022 Cummings ............ G06N 20/00

OTHER PUBLICATIONS

Zhu. Solving Math Word Problems via Cooperative Reasoning induced Language models, arXiv, 2022, whole document (Year: 2022).*
International Search Report and Written Opinion for PCT Application No. PCT/US2023/036341, dated Feb. 23, 2024. 17 pages.
Brown et al. 2020. Language models are few-shot learners. Advances in neural information processing systems, 33:1877-1901.
Caruana et al. 2004. Ensemble selection from libraries of models. In Proceedings of the twenty-first international conference on Machine learning, 8 pages.
Deng et al. 2022. RLPrompt: Optimizing discrete text prompts with reinforcement learning. arXiv preprint arXiv:2205.12548. 23 pages.

(Continued)

*Primary Examiner* — Sonia L Gay
(74) *Attorney, Agent, or Firm* — Lerner David LLP

(57) ABSTRACT

Aspects of the disclosure are directed to automatically selecting examples in a prompt for an LLM to demonstrate how to perform tasks. Aspects of the disclosure can select and build a set of examples from LLM zero-shot outputs via predetermined criteria that can combine consistency, diversity, and repetition. In the zero-shot setting for three different LLMs, using only LLM predictions, aspects of the disclosure can improve performance up to 15% compared to zero-shot baselines and can match or exceed few-shot baselines for a range of reasoning tasks.

19 Claims, 10 Drawing Sheets

(56) References Cited

OTHER PUBLICATIONS

Grandvalet et al. 2004. Semi-supervised learning by entropy minimization. Advances in neural information processing systems, 17. 8 pages.
Huang et al. 2022. Large language models can self-improve. arXiv preprint arXiv:2210.11610. 19 pages.
Klein et al. 2017. OpenNMT: Open-source toolkit for neural machine translation. arXiv preprint arXiv:1701.02810. 6 pages.
Kojima et al. 2022. Large language models are zero-shot reasoners. Advances in Neural Information Processing Systems (NeurIPS) 35. 42 pages.
Lee et al. 2013. Pseudo-label: The simple and efficient semi-supervised learning method for deep neural networks. In Workshop on challenges in representation learning, ICML, vol. 3, 7 pages.
Li et al. 2022a. Self-prompting large language models for open-domain QA. arXiv preprint arXiv:2212.08635. 13 pages.
Li et al. 2022b. On the advance of making language models better reasoners. arXiv preprint arXiv:2206.02336. 13 pages.
Liu et al. 2021. What makes good in-context examples for gpt-3? arXiv preprint arXiv:2101.06804. 12 pages.
Paulus et al. 2017. A deep reinforced model for abstractive summarization. arXiv preprint arXiv:1705.04304. 12 pages.
Radford et al. 2018. Language models are unsupervised multitask learners. 24 pages.
Rae et al. 2021. Scaling language models: Methods, analysis & insights from training gopher. arXiv preprint arXiv:2112.11446. 118 pages.
Rizve et al. 2021. In defense of pseudo-labeling: An uncertainty-aware pseudo label selection framework for semi-supervised learning. arXiv preprint arXiv:2101.06329. 20 pages.
Rubin et al. 2021. Learning to retrieve prompts for in-context learning. arXiv preprint arXiv:2112.08633. 17 pages.
Schulman et al. 2022. ChatGPT: Optimizing language models for dialogue. Introducing ChatGPT Blog. Retrieved on Mar. 29, 2023. Retrieved from the Internet: <https://openai.com/blog/chatgpt>. 10 pages.
Shi et al. 2018. Transductive semi-supervised deep learning using min-max features. In Proceedings of the European Conference on Computer Vision (ECCV), pp. 299-315.
Su et al. 2022. Selective annotation makes language models better few-shot learners. arXiv preprint arXiv:2209.01975. 21 pages.
Thoppilan et al. 2022. LaMDA: Language models for dialog applications. arXiv preprint arXiv:2201.08239. 47 pages.
Van Hasselt et al. 2016. Learning values across many orders of magnitude. Advances in neural information processing systems, 29. 19 pages.
Wang et al. 2018. GLUE: A multi-task benchmark and analysis platform for natural language understanding. In Proceedings of the 2018 EMNLP Workshop BlackboxNLP: Analyzing and Interpreting Neural Networks for NLP, pp. 353-355, Brussels, Belgium. Association for Computational Linguistics.
Wang et al. 2019. SuperGLUE: A stickier benchmark for general-purpose language understanding systems. Advances in neural information processing systems, 32. 30 pages.
Wang et al. 2022. Self-consistency improves chain of thought reasoning in language models. arXiv preprint arXiv:2203.11171. 24 pages.
Wei et al. 2022a. Emergent abilities of large language models. arXiv preprint arXiv:2206.07682. 30 pages.
Wei et al. 2022b. Chain of thought prompting elicits reasoning in large language models. arXiv preprint arXiv:2201.11903. 43 pages.
Weng et al. 2022. Large language models are reasoners with self-verification. arXiv preprint arXiv:2212.09561. 24 pages.
Zelikman et al. 2022. STaR: Self-taught reasoner bootstrapping reasoning with reasoning. 30 pages.
Zhang et al. 2022. Automatic chain of thought prompting in large language models. arXiv preprint arXiv:2210.03493. 25 pages.

* cited by examiner

| Input | Output |
|---|---|
| Q: [Question]<br>A: Let's think step by step | How much money does he have now?<br>Henry has 11 + 18 − 10 = 27. Incorrect |
| [Demo1]<br>Q: [Question]<br>A: Let's think step by step | He had 11 + 18 = 29 dollars. He spent 10 dollars on a game, so he has 29 − 10 = 19 dollars. Correct |
| [Demo2]<br>Q: [Question]<br>A: Let's think step by step | He had 11 dollars. He had 11 dollars. He had 11 dollars. He had 11 dollars. . . Incorrect |
| [Demo3]<br>Q: [Question]<br>A: Let's think step by step | 11 + 18 = 29. 29 − 10 = 19. 19 / 2 = 9 9 / 2 = 4 4 / 2 = 2. 2 / 2 = 1. 1 / 2 = 0. Incorrect |
| [Demo3] [Demo1]<br>Q: [Question]<br>A: Let's think step by step | 11 + 18 = 29. 29 − 10 = 19. Correct |

FIG. 1

| Model | PaLM-62B | | | | PaLM-540B | | | | |
|---|---|---|---|---|---|---|---|---|---|
| Setting | 0-shot | 0-shot | | 5-shot | Prev | 0-shot | 0-shot | | 5-shot | Prev |
| Method | CoT | Auto-CoT | COSP (Ours) | 5-shot CoT | 8-shot CoT | CoT | Auto-CoT | COSP (Ours) | 5-shot CoT | 8-shot CoT |
| # Paths | 14 | 14 | 7+7 | 14 | | 14 | 14 | 7+7 | 14 | |
| MultiArith | 67.2 | 93.4 | 85.0 | 81.0 | - | 95.2 | 99.0 | 98.8 | 96.0 | 99.3[b] |
| AddSub | 69.1 | 73.2 | 78.9 | 72.4 | - | 89.9 | 89.1 | 89.9 | 86.6 | 93.7[b] |
| SingleEq | 74.4 | 77.8 | 78.7 | 79.8 | - | 88.6 | 85.6 | 90.4 | 89.2 | - |
| GSM-8K | 20.9 | 9.2 | 30.2 | 30.3 | 27.4[a] | 68.5 | 71.4 | 71.9 | 64.3 | 74.4[b] |
| CSQA | 46.5 | 68.2 | 60.2 | 66.8 | - | 74.2 | 70.4 | 70.4 | 80.7 | 80.7[b] |
| StrategyQA | 57.2 | 59.4 | 64.7 | 67.9 | - | 66.0 | 75.7 | 75.2 | 81.4 | 81.6[b] |
| (Average) | 55.88 | 63.55 | 66.28 | 66.37 | - | 80.25 | 83.37 | 83.77 | 83.03 | - |

FIG. 9

| Model | GPT-3 (code-davinci-001) | | | | |
|---|---|---|---|---|---|
| Setting | 0-shot | | | 5-shot | |
| Method | 0-shot CoT | Auto-CoT | COSP (Ours) | 5-shot CoT | Prev 8-shot CoT |
| # Paths | 14 | 14 | 7+7 | 14 | |
| MultiArith | 50.3 | 78.5 | 80.7 | 60.7 | 82.7[b] |
| AddSub | 43.5 | 31.9 | 61.5 | 63.3 | 67.8[b] |
| SingleEq | 48.8 | 58.1 | 64.8 | 65.9 | - |
| GSM-8K | 10.2 | 6.6 | 8.7 | 16.7 | 23.4[b] |
| CSQA | 29.2 | 50.9 | 55.4 | 53.0 | 54.9[b] |
| StrategyQA | 47.8 | 55.8 | 52.8 | 55.4 | 61.7[b] |
| (Average) | 38.32 | 46.96 | 53.98 | 52.60 | - |

FIG. 10

SELF-IMPROVING LLMS THROUGH CONSISTENCY-BASED SELF-GENERATED DEMONSTRATIONS

CROSS-REFERENCE TO RELATED APPLICATIONS

The present application claims the benefit of the filing date of U.S. Provisional Patent Application No. 63/480,789, filed Jan. 20, 2023, the disclosure of which is hereby incorporated herein by reference.

BACKGROUND

Recent advances in large language models (LLMs) have led to good performance in natural language processing (NLP) tasks and to exciting emergent abilities, such as strong performance on tasks that require analytical reasoning and/or methodical planning. This has been made possible by scaling the model size and training corpus, the strong few-shot and zero-shot abilities of modern LLMs, and techniques such as chain-of-thought (CoT) methods. Few-shot CoT prepends test queries with solved input-output pairs as in-context examples to prompt the LLM to generate rationales. Zero-shot CoT appends trigger phrases after test queries to elicit reasoning. These approaches improve on model fine-tuning, which can be costly for LLMs due to their sheer size and is not possible when the LLMs are available as inference-only APIs.

Despite these advances, numerous open challenges remain. Although Zero-shot CoT is task-agnostic and does not require manual effort for labeling, it often underperforms its few-shot counterparts, with LLMs that are not shown with "template rationale" often producing spurious reasoning steps. On the other hand, for Few-shot CoT, the performance has been shown to be sensitive to the choice of the demonstrations, and thus improving the performance might require significant trial-and-errors and/or specific relevant expertise. Given the fact that LLMs are often used for diverse downstream tasks, selecting useful per-task few-shot examples becomes even more laborious and difficult.

BRIEF SUMMARY

Aspects of the disclosure are directed to automatically selecting examples in a prompt for a large language model (LLM) to demonstrate how to perform tasks. For instance, starting with a test dataset, where part of the test dataset is not yet known to the LLM, an output prediction from a LLM can be computed by prompting and using zero-shot chain of thought (CoT). A consistency from the LLM can be computed for each test instance, defined as the negative entropy of the outputs. Majority vote can also be used to approximately marginalize a random variable capturing random dynamics in the LLM to give the overall LLM prediction. An embedding can be computed from an auxiliary language model to measure similarity. In context learning, for a test example, the input can be concatenated with a demonstration including the prediction from the LLM itself. Aspects of the disclosure can enhance performance of LLMs while saving computing resources, such as memory usage or processing power, by improving LLM outputs with less input.

An aspect of the disclosure provides for a method for consistency based self-adaptive prompting, including: generating, by one or more processors, a pool of demonstrations using a large language model (LLM) for a plurality of test queries; selecting, by the one or more processors, a set of demonstrations from the pool of demonstrations based on a score associated with self-consistency for each demonstration; prepending, by the one or more processors, the set of demonstrations to the plurality of test queries; and generating, by the one or more processors, a plurality of predictions based on the test queries prepended with the set of demonstrations using the LLM.

In an example, the method further includes receiving, by the one or more processors, the plurality of test queries, each test query being concatenated with a trigger phrase or a labeled demonstration.

In another example, generating the pool of demonstrations further includes running chain-of-thought (CoT) over the plurality of test queries. In yet another example, the CoT includes Zero-shot CoT or Few-shot CoT. In yet another example, the CoT is run multiple times using the LLM to generate multiple reasoning paths and different predictions for each test query.

In yet another example, selecting a set of demonstrations further includes computing a majority vote prediction and retaining only reasoning paths that result in a majority vote prediction. In yet another example, the majority vote prediction is computed based on entropy and repetitiveness.

In yet another example, prepending the set of demonstrations further includes adaptively allocating a number of demonstrations per test query that is proportional to an entropy of the test query. In yet another example, generating the plurality of predictions further includes querying the test queries prepended with the set of demonstrations multiple times using the LLM to generate multiple predictions for each test query. In yet another example, the method further includes: selecting, by the one or more processors, a prediction of the multiple predictions for each test query based on a majority voting; and outputting, by the one or more processors, the selected prediction for each test query.

Another aspect of the disclosure provides for a system including: one or more processors; and one or more storage devices coupled to the one or more processors and storing instructions that, when executed by the one or more processors, cause the one or more processors to perform operations for consistency based self-adaptive prompting. The operations include: generating a pool of demonstrations using a large language model (LLM) for a plurality of test queries; selecting a set of demonstrations from the pool of demonstrations based on a score associated with self-consistency for each demonstration; prepending the set of demonstrations to the plurality of test queries; and generating a plurality of predictions based on the test queries prepended with the set of demonstrations using the LLM.

In an example, generating the pool of demonstrations further includes running chain-of-thought (CoT) over the plurality of test queries, wherein the CoT is run multiple times using the LLM to generate multiple reasoning paths and different predictions for each test query. In yet another example, selecting a set of demonstrations further includes computing a majority vote prediction and retaining only reasoning paths that result in a majority vote prediction, the majority vote prediction being computed based on entropy and repetitiveness.

In yet another example, generating the plurality of predictions further includes querying the test queries prepended with the set of demonstrations multiple times using the LLM to generate multiple predictions for each test query. In yet another example, the operations further include selecting a prediction of the multiple predictions for each test query based on a majority voting.

Yet another aspect of the disclosure provides for a non-transitory computer readable medium for storing instructions that, when executed by one or more processors, cause the one or more processors to perform operations for consistency based self-adaptive prompting. The operations include: generating a pool of demonstrations using a large language model (LLM) for a plurality of test queries; selecting a set of demonstrations from the pool of demonstrations based on a score associated with self-consistency for each demonstration; prepending the set of demonstrations to the plurality of test queries; and generating a plurality of predictions based on the test queries prepended with the set of demonstrations using the LLM.

In an example, generating the pool of demonstrations further includes running chain-of-thought (CoT) over the plurality of test queries, wherein the CoT is run multiple times using the LLM to generate multiple reasoning paths and different predictions for each test query. In another example, selecting a set of demonstrations further includes computing a majority vote prediction and retaining only reasoning paths that result in a majority vote prediction, the majority vote prediction being computed based on entropy and repetitiveness.

In yet another example, generating the plurality of predictions further includes querying the test queries prepended with the set of demonstrations multiple times using the LLM to generate multiple predictions for each test query. In yet another example, the operations further include selecting a prediction of the multiple predictions for each test query based on a majority voting.

BRIEF DESCRIPTION OF THE DRAWINGS

FIG. 1 depicts LLM inputs and outputs for an example question and demonstrations according to aspects of the disclosure.

FIG. 9 depicts a table of results on PaLM-62 B and PaLM-540B for consistency based self-adaptive prompting according to aspects of the disclosure.

FIG. 10 depicts a table of results on GPT-3 for consistency based self-adaptive prompting according to aspects of the disclosure.

DETAILED DESCRIPTION

Figure 2:
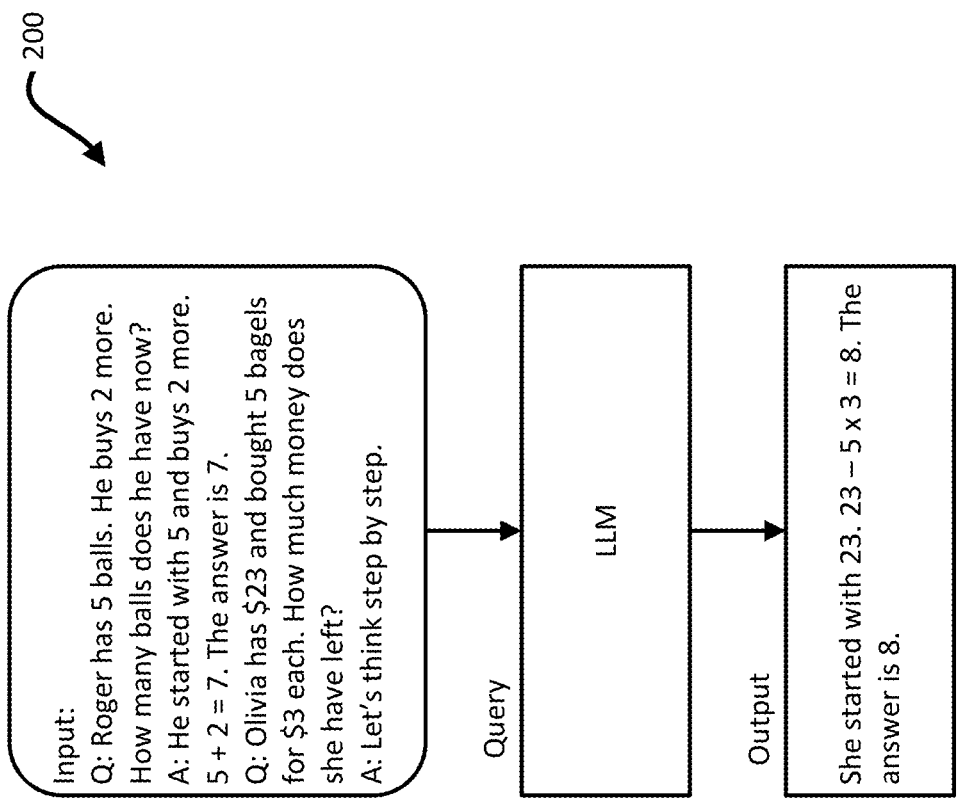
FIG. 2 depicts an example Few-shot CoT according to aspects of the disclosure.

Modern large language models (LLMs) have demonstrated impressive capabilities at sophisticated tasks, often through step-by-step reasoning. This is made possible by their strong few and zero-shot abilities—LLMs can effectively learn from a handful of responses, e.g., in-context examples, or are prompted to reason spontaneously through specially designed triggers. Nonetheless, some limitations have been observed. First, performance in the few-shot setting is sensitive to the choice of examples. Thus, the choice of examples can require significant effort. Moreover, given the diverse downstream tasks of LLMs, it may be difficult or laborious to determine per-task labels. Second, performance of the zero-shot setting can be limited due to the lack of guidance to the LLMs.

To address these limitations, generally disclosed herein are implementations for consistency-based self-adaptive prompting, also referred to as COSP. COSP can select and build a set of examples from LLM zero-shot outputs via predetermined criteria that can combine consistency, diversity, and repetition. In the zero-shot setting for three different LLMs, using only LLM predictions, COSP can improve performance up to 15% compared to zero-shot baselines and can match or exceed few-shot baselines for a range of reasoning tasks.

LLM reasoning can be improved in the general zero-shot setup with access to input queries but not labels. Instead of relying on simple triggers or predetermined examples, the LLMs can be prompted with the outputs generated by their own. To achieve this, a pool of rationales and answers to test questions that are generated by the LLM using Zero-shot CoT are collected. Then, suitable questions and answers for in-context learning are selected.

The choice of which self-generated rationales to include, however, is highly non-trivial, as LLM output is sensitive to in-context demonstrations and their reasoning, especially when automatically generated and imperfect. Consider the following example question and demonstrations:

Question: Henry had 11 dollars. For his birthday he got 18 more dollars but spent 10 on a new game. How much money does he have now?

Demo1: Q: John bought 21 games from a friend and bought 8 more at a garage sale. If 23 of the games didn't work, how many good games did he end up with? A: Let's think step by step. He bought 21+8=29 games in total. He has 29-23=6 good games. Correct.

Demo2: Q: John bought 21 games from a friend and bought 8 more at a garage sale. If 23 of the games didn't work, how many good games did he end up with? A: Let's think step by step. He bought 21+8=29 games in total. He bought 21+8=29 games in total. He bought 21+8=29 games in total. He has 29-23=6 good games. He has 29-23=6 good games. Correct.

Demo3: Q: Faye picked 23 and her mother picked 5 carrots from the garden. If only 12 of the carrots were good, how many carrots were bad? A: Let's think step by step. 23+5=28. 28-12=16. 16/2=8. 8/2=4. 4/2=2. 2/2=1. 1/2=0. Incorrect.

FIG. 1 depicts LLM inputs and outputs 100 for the example question and demonstrations. The first row 110 depicts zero-shot CoT with no demo, resulting in correct logic but the wrong answer. The second row 120 depicts a correct demo and results in a correct answer. The third row 130 depicts a correct but repetitive demo, resulting in repetitive outputs. The fourth row 140 depicts an erroneous demo, resulting in a wrong answer, but the fifth row 150 depicts that combining the third demo with the first demo results in a correct answer.

Retrieval methods assuming perfect labels can perform worse than random in this setup. This issue can be bypassed by focusing only on surface text similarity and diversity of the question embeddings, but in cases when most of the initial generated outputs are wrong, this can be misleading.

To address these challenges, COSP is an approach that can provide strong performance without requiring labeled examples while further improving the performance when a few labeled examples become available. The approach includes two stages. In the first stage, COSP collects a pool of LLM responses to test questions via Zero-shot CoT. The LLM responses are used to compute an outcome entropy of each question. The outcome entropy is used to identify suitable question-reasoning pairs in an unsupervised manner. In the second stage, another pass is performed over all test samples, but with the identified question-reasoning pairs as in-context demonstrations. COSP can increase the performance of LLMs while saving computing resources, such as memory usage or processing power.

With three different LLMs on a range of tasks, COSP can demonstrate a 10-15% improvement in average accuracy for 6 arithmetic and logical reasoning tasks over Zero-shot CoT with self-consistency baseline in PaLM-62B and GPT-3, and >3% improvement in PaLM-540B. This can be achieved with a negligible additional computational cost. COSP can perform on par or better than few-shot baselines with predetermined in-context examples.

Figure 3:
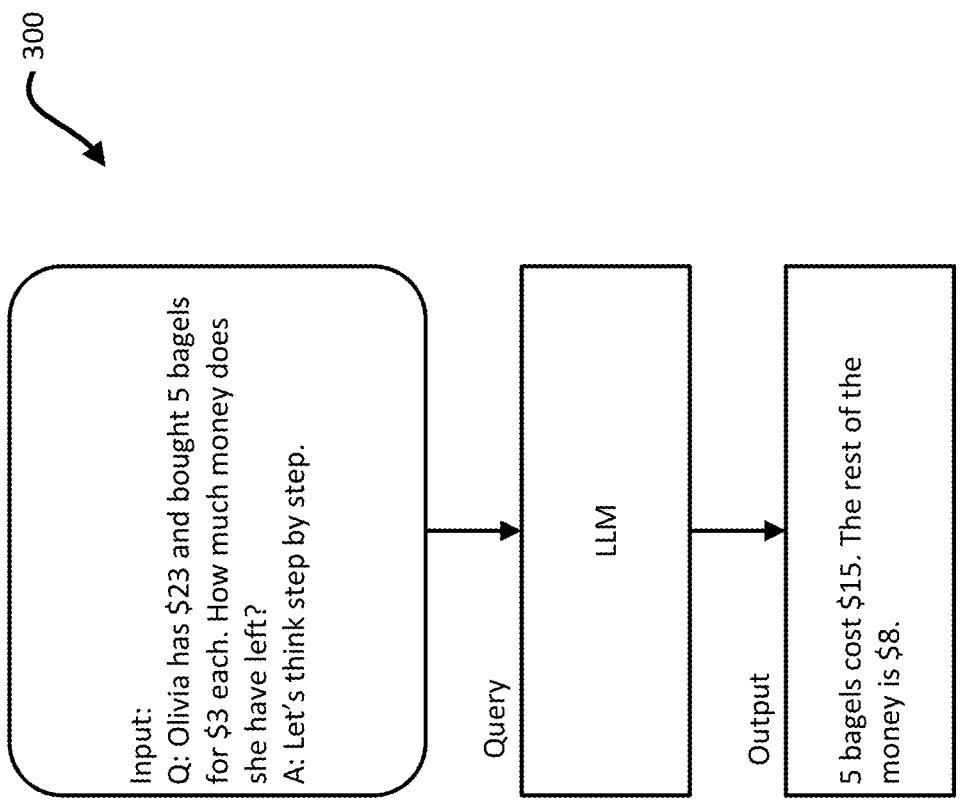
FIG. 3 depicts an example Zero-shot CoT according to aspects of the disclosure.

Few-shot CoT prompting can prepend test questions with one or more in-context demonstrations of related solved questions as prompts. FIG. 2 depicts an example few-shot CoT 200, shown as a 1-shot CoT with one provided and completed question-rationale-answer set. Here, the query "Olivia has $23 and bought 5 bagels for $3 each. How much money does she have left?" is prepended with the demonstration "Q: Roger has 5 balls. He buys 2 more. How many balls does he have now? A: He started with 5 and buys 2 more. 5+2=7. The answer is 7." While only one demonstration is shown, the query can be prepended with additional demonstrations. The LLM can use the demonstration to help with providing an answer for the query. The few-shot CoT 200 may or may not include a trigger phrase. Zero-shot CoT can concatenate a trigger phrase, e.g., "Let's think step by step", to a test question, rather than one or more in-context demonstrations. FIG. 3 depicts an example zero-shot CoT 300 with a trigger phrase. Here, the query "Olivia has $23 and bought 5 bagels for $3 each. How much money does she have left?" is prepended with the trigger phrase "A: Let's think step by step." Both few-shot CoT and zero-shot CoT can prompt an LLM to output intermediate steps.

Self-consistency can approximate marginal distributions of the LLM via majority voting of multiple decoded reasoning paths, leading to significant performance boosts across various tasks. It is compatible with either Zero- or Few-shot CoT by introducing probabilistic decoding in the LLM decoding using a non-zero temperature, and then sampling m reasoning paths, each including a rationale-answer pair $(r^{(i)}, \hat{y}^{(i)})$ from the LLM posterior:

$$\{(r_j^{(i)}, \hat{y}_j^{(i)})\}_{j=1}^m \sim p(r^{(i)}, \hat{y}^{(i)} | x^{(i)}, c, \theta), \qquad (1)$$

where $x^{(i)}$ are the test questions, c denotes the general format of the prompt template, e.g., the choice of in-context demonstrations in Few-shot CoT or the trigger phrase in Zero-shot CoT, and θ denotes the weights that parametrize the LLM. The prediction with the majority or the plurality vote is then chosen as the final prediction:

$$\hat{y}^{(i)} = \operatorname{argmax} \hat{y}_j^{(i)} \sum_{k=1}^m \mathbb{1}(\hat{y}_j^{(i)} = \hat{y}_k^{(i)}). \qquad (2)$$

Consider a test set D with |D|=N test examples. Given an LLM and a test query $x^{(i)} \in D$, where test labels $y^{(i)}$ may not be available to the LLM, a set of K demonstrations S can be generated, where each demonstration $s_k$ can be a concatenation of another test question $x^{(i_k)} \in D_{\setminus i}$, the generated rationale $(r^{(i_k)})$, and the final prediction $(\hat{y}^{(i_k)})$ from the LLM, such as via Zero-shot CoT:

$$s_k = \operatorname{Concatenate}(x^{(i_k)}, r^{(i_k)}, \hat{y}^{(i_k)}). \qquad (3)$$

The set S can then be prepended as context to the test question $x_i$ serving as a guide to the LLM:

$$\tilde{x}^{(i)} = \operatorname{Concatenate}(s_1, \ldots, s_K, x^{(i)}), \qquad (4)$$

and $\tilde{x}^{(i)}$ can be queried again, e.g., in-context learning. A set of in-context demonstrations S can be generated that can maximize the LLM performance without accessing ground-truth labels.

Figure 4:
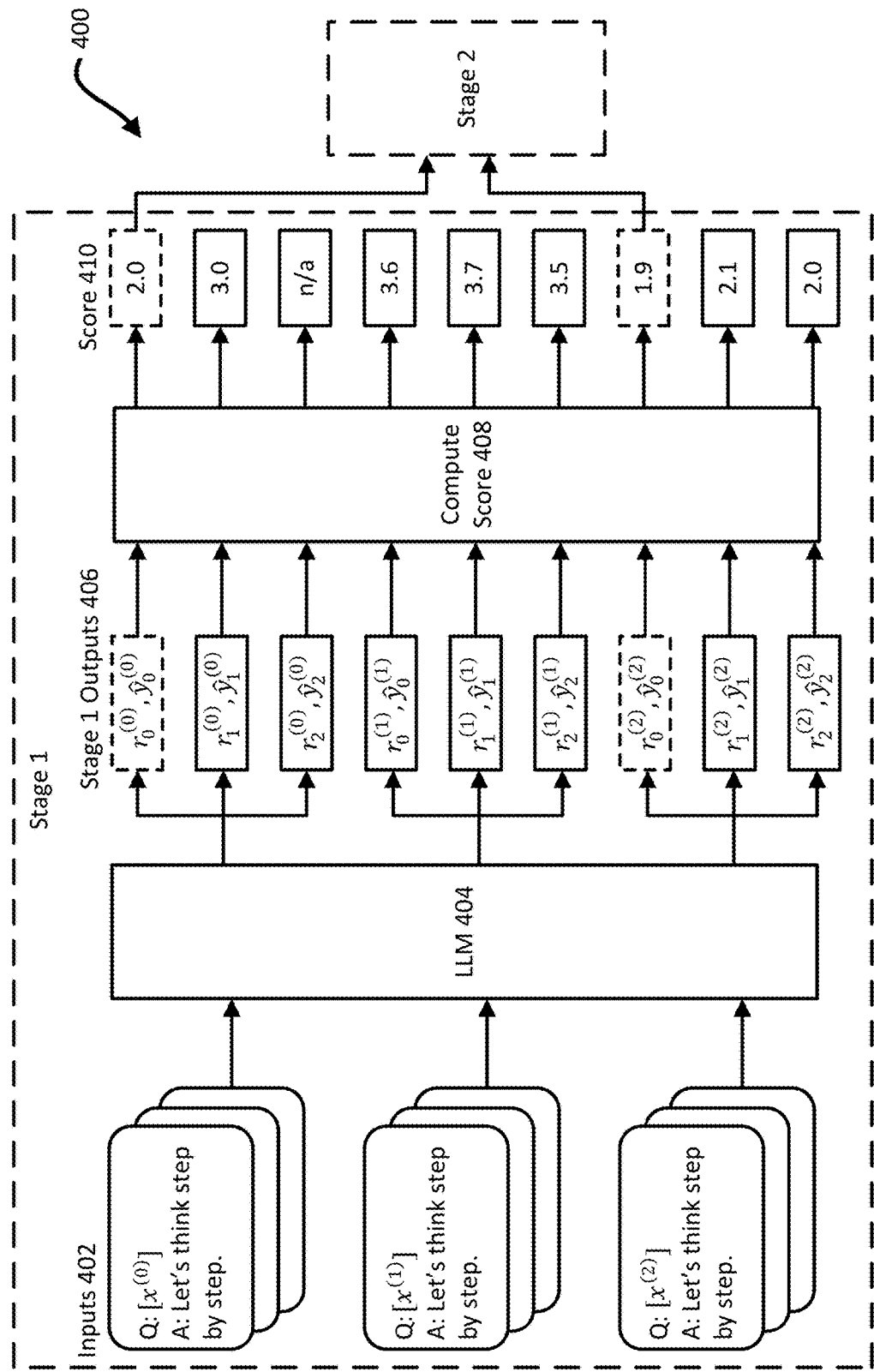
FIG. 4 depicts a block diagram of an example system for a first stage of consistency based self-adaptive prompting according to aspects of the disclosure.

FIG. 4 depicts a block diagram of an example system 400 for the first stage of COSP. The first stage can generate a pool of responses and select demonstrations. The system 400 can include a plurality of inputs 402, an LLM 404, a plurality of outputs 406, a score compute module 408, and a plurality of scores 410. The inputs 402 can include test questions and a trigger for Zero-shot CoT. The outputs 406 can include reasoning paths and answers. It should be noted the number of elements shown are for example purposes only and not intended to be limiting.

A pool of responses P to the test questions D can be generated, from which demonstrations S can be selected. Each element of P can be a candidate demonstration, such as defined by Eq. 3. To generate the pool of responses, Zero-shot CoT can be run using the LLM 404 over all test questions. For each test question $x^{(i)}$, the LLM 404 can be queried m times with a non-zero temperature to extract multiple reasoning paths $\{r_j^{(i)}\}_{j=1}^m$ and potentially different answers $\{\hat{y}_j^{(i)}\}_{j=1}^m$, such as according to Eq. 1. Sampling m paths per question can yield mN candidates. Non-zero temperature can correspond to variation in output as a subsequent token is sampled from the distribution over vocabulary instead of decoded greedily. The non-zero temperature can be greater than 0 but less than or equal to 1, such as 0.7. The LLM can be queried 10 to 40 times, such as 14 times, depending on available computing resources or latency.

With the candidate pool 406 generated, S demonstrations can be selected from it. The selection process can be challenging, as a small number, e.g., less than or equal to 10, of candidates can be selected from a large, imperfect pool. Due to the absence of access to ground-truth labels, responses in the pool can be potentially erroneous and mislead the LLM 404, which can be sensitive to the selected demonstrations.

To address this challenge, self-consistency can be used both to prune the candidate pool P and to select the demonstrations in absence of ground-truth labels. For each test question $x^{(i)}$, a majority vote prediction $\hat{y}(1)$ is computed from all predictions $\{\hat{y}_j^{(i)}\}_{j=1}^m$, such as with Eq. 2. Rationales that lead to a majority vote prediction may be retained, as majority vote predictions are more likely to be correct. The remaining rationale-prediction pairs, which are more likely to be wrong, can be pruned from the candidate pool P. Heuristics can also be utilized to remove obviously bad candidates from the candidate pool P as well, such as responses containing no numbers for arithmetic tasks, or overly short and/or fragmented responses. For example, the following questions or rationales can be pruned: (1) responses that feature no numbers for arithmetic tasks, responses that involve generated questions, overly short rationales, e.g., responses containing fewer than 5 tokens, and/or overly fragmented responses, e.g., after separating rationales into phrases with punctuation marks as delimiters, responses are filtered out that feature more than 10 fragments. After pruning, for a test question $x^{(i)}$, the set P can be given by:

$$P = \bigcup_{i=1}^{N} \bigcup_{j=1}^{\overline{m}^{(i)}} (x^{(i)}, r_j^{(i)}, \hat{y}^{(i)}), \quad (5)$$

where j indexes over all $\overline{m}^{(i)}$ reasoning paths in the i-th question that led to the majority vote prediction $\hat{y}^{(i)}$ and are not otherwise excluded. Pruning rationale-prediction pairs can save computing resources while improving LLM performance.

For selecting the demonstrations, if the LLM 404 outputs the same prediction path repeatedly even under different reasoning paths, the LLM 404 can be expected to be more confident in its prediction. A stronger indication that the prediction is correct or at least plausible can be assigned to that prediction path. To capture model uncertainty, for a question $x^{(i)}$ with m final answers from which it is assumed there are n≤m unique answers $\hat{y}_1^{(i)}, \ldots, \hat{y}_n^{(i)}$, normalized entropy can be computed as:

$$H(x^{(i)}) = \frac{\sum_{\alpha=1}^{n} \tilde{p}(\hat{y}_\alpha^{(i)}) \log \tilde{p}(\hat{y}_\alpha^{(i)})}{\log m}, \quad (6)$$

where α is used to index over unique answers, $\tilde{p}(\hat{y}_\alpha^{(i)})$ is an empirical frequency of unique answer $\hat{y}_\alpha^{(i)}$ in all m answers, and entropy is normalized by log log m, the negative maximum entropy if all predictions are different from each other, to [0,1]. Normalized entropy can be a proxy over a number of different tasks where low entropy can be positively correlated with correctness.

Eq. 6 can score test questions $x^{(i)}$, but for each $x^{(i)}$, especially for those with low outcome entropy, there can be multiple reasoning paths $r_j^{(i)}$ for the majority rule prediction. While they lead to the same final answer, their suitability as in-context demonstrations can differ. Repetitive demonstrations can often lead to worse performance, depicted by Demo2 in FIG. 1. Repetitive responses acting as demonstrations can create a strong but spurious pattern on which LLMs can be prone to overfit, often leading to deterioration of performance.

To address this, responses that involve self-questioning can be filtered out, as these responses can often lead to repetition or prompt the LLM to answer the generated questions instead of the original question. Demonstrations can also be split in phrases delimited by punctuation marks. Assuming there are Q phrases, repetitiveness can be computed as:

$$R_r(r_j^{(i)}) = \frac{2}{Q(Q-1)} \left( \sum_{a=1}^{Q} \sum_{b=a+1}^{Q} W_{ab} \right), \quad (7)$$

where $W \in R_+^{Q \times Q}$ is the similarity matrix over all pairs of phrases with $W_{ab} = S_c(\phi(q_a), \phi(q_b))$, where $S_c(\cdot, \cdot)$ computes the cosine similarity and $\phi(q_a)$ and $\phi(q_b)$ denote the vector embedding of a-th and b-th phrases, obtained through an auxiliary, small language model. The auxiliary, small language model can receive a sentence and output a sentence-level vector embedding to capture semantics of the sentence. From Eq. 7, the matrix can be summarized by averaging across off-diagonal elements, which gives an average similarity between two arbitrary phrases in the response. Other techniques that can penalize repetition at decoding can be applied, such as hard or soft n-gram blocking. N-gram block can prevent verbatim repetition in text generation, where n is a hyperparameter, e.g., 2. In hard n-gram blocking, a set of n-grams can be constructed from intermediate decoded texts. When generated further, the generation of the exact n-grams that have appeared before can be blocked. For example, if the intermediate output is "I like NLP" and n=2, "I like" and "like NLP" is blocked from generating in the subsequently generated texts. For soft n-gram blocking, repeating n-grams can be penalized but are not necessarily ruled out.

With measures of consistency, e.g., Eq. 6, and repetitiveness, e.g., Eq. 7, defined, for a candidate demonstration $p \in P$ given by the concatenation of question $x^{(i)}$, rationale $r_j^{(i)}$, and the majority prediction $\hat{y}^{(i)}$, the score 410 can be computed, such as by a score compute module 408, as:

$$F(p) = H(x^{(i)}) + \lambda R_r(r_j^{(i)}), \quad (8)$$

where λ is a trade-off hyperparameter to determine relative strength of the different terms of the cost function. The trade-off hyperparameter can be from 0 to 1, such as 0.2. To ensure that different terms of Eq. 8 are of a comparable scale, z-score normalization can be employed by replacing each term with their respective z-score, with mean and standard deviation computed over P. To select a single in-context demonstration (K=1), a minimizer of the scoring function can be utilized, such as $p^* = \arg\min_{p \in P} F(p)$. To select multiple demonstrations, a combinatorial selection problem can be solved, such as via a greedy forward selection procedure. For example, S can be initialized with $p^*$ and in a greedy manner, the minimizer of the following objective function can be selected:

$$G_k(p) = F(p) + \lambda R_q(p, S_{k-1}) \forall k \in [2, K], \quad (9)$$

where $S_{k-1}$ can be the partially built demonstration set S with k−1 elements already selected, and $$R_q(p, S_{k-1}) = \max(\{S_c(\phi(p), \phi(s_{k'}))\}_{k'=1}^{k-1}) \quad (10)$$

is a term to encourage diversity in question types and reasoning patterns in S by penalizing demonstrations that are similar to previous ones. It can be additionally constrained that S should not contain multiple reasoning paths to the same question. The objective function can be repeated until all K demonstrations of S are selected.

The general process for the greedy forward selection procedure for generating the set of demonstrations can be further described as follows:
(1) Initialize S with the minimizer of Eq. 8: S←{$p_0^*$=arg min$_{p \in P}$F(p)};
(2) for k∈[2, K] do:
(3) Find the minimizer of the modified objective (Eq. 9): $p^*_k$=arg min$_{p \in P}$G$_k$(p);
(4) Add $p^*_k$ to S and remove $p^*_k$ from candidate pool P;
(5) end for.

Figure 5:
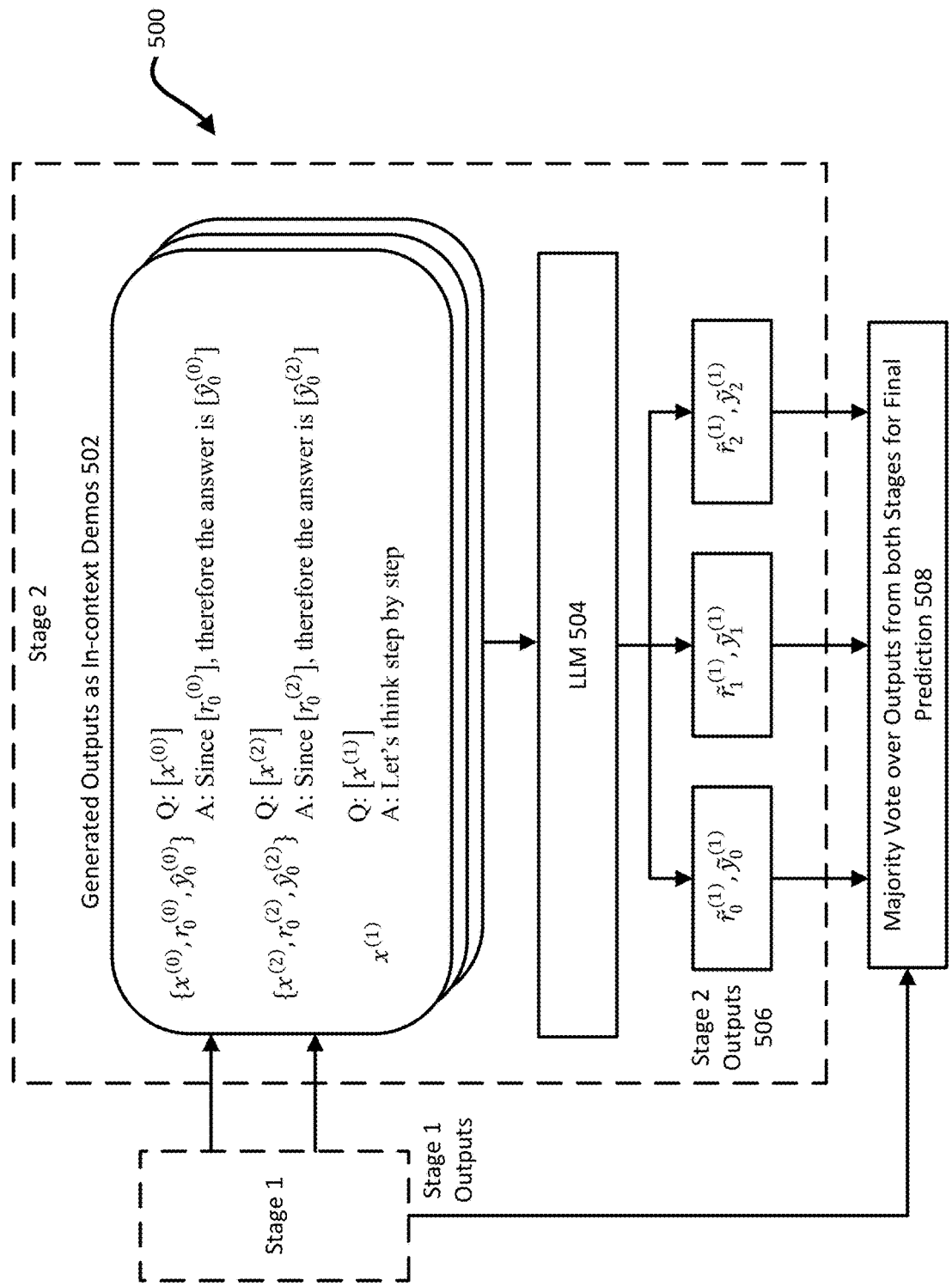
FIG. 5 depicts a block diagram of an example system for a second stage of consistency based self-adaptive prompting according to aspects of the disclosure.

FIG. 5 depicts a block diagram of an example system 500 for the second stage of COSP. The second stage can query with the selected demonstrations. The system 500 can include generated outputs as in-context demonstrations 502, an LLM 504, which can correspond to the LLM 404 of FIG. 4, and output 506. It should be noted the number of elements shown are for example purposes only and not intended to be limiting.

With the demonstrations S selected, stage two can concatenate and/or prepend the selected demonstrations to the test questions, e.g., Eq. 3 and 4, and can query the LLM 504 again with m more repetitions. The final prediction for each question can then be output as the majority vote 508 across the predictions from both stages.

Entropy, e.g., Eq. 6, can be utilized to gauge difficulty of a test question to the LLM 504, as a higher entropy implies that the LLM 504 may require additional demonstrations for this question. Therefore, COSP can include an adaptively allocated number of in-context demonstrations per question that is proportional to its zero-shot entropy during the first stage, with higher entropy questions given more demonstrations.

COSP can also be adapted to a few-shot setup, where a small number of labeled demonstrations Q can be available. The labeled demonstrations can be augmented with more demonstrations. Instead of querying LLMs with Zero-shot CoT in the first stage, Few-shot CoT can be utilized with Q. Further, construction of S is initialized with Q instead of an empty set.

The general process for COSP can be further described as follows:
(1) Input: Test questions D={$x^{(i)}$}$_{i=1}^N$, LLM, # paths per sample m, Pool of generated responses P←∅.
(2) Output: Predictions {$\hat{y}^{(i)}$}$_{i=1}^N$.
(3) for i∈[1, N] do:
(4) Query the LLM with Zero-shot CoT to obtain m rationales and predictions {$r_j^{(i)}, \hat{y}_j^{(i)}$}$_{i=1}^m$ to $x^{(i)}$;
(5) Add candidate demos (Eq. 3) that led to the majority vote prediction to P;
(6) end for.
(7) Generate the set of demonstrations S using Eq. 8 and 9.
(8) for i∈[1, N] do:
(9) Concatenate the S to $x^{(i)}$ (Eq. 4) and query the LLM again to obtain m new rationales and answers or an adaptive number of new rationales and answers proportional to the entropy of $x^{(i)}$;
(10) Compute the majority vote over 2m answers from both stage as the final answer $\hat{y}^{(i)}$;
end for.

Figure 6:
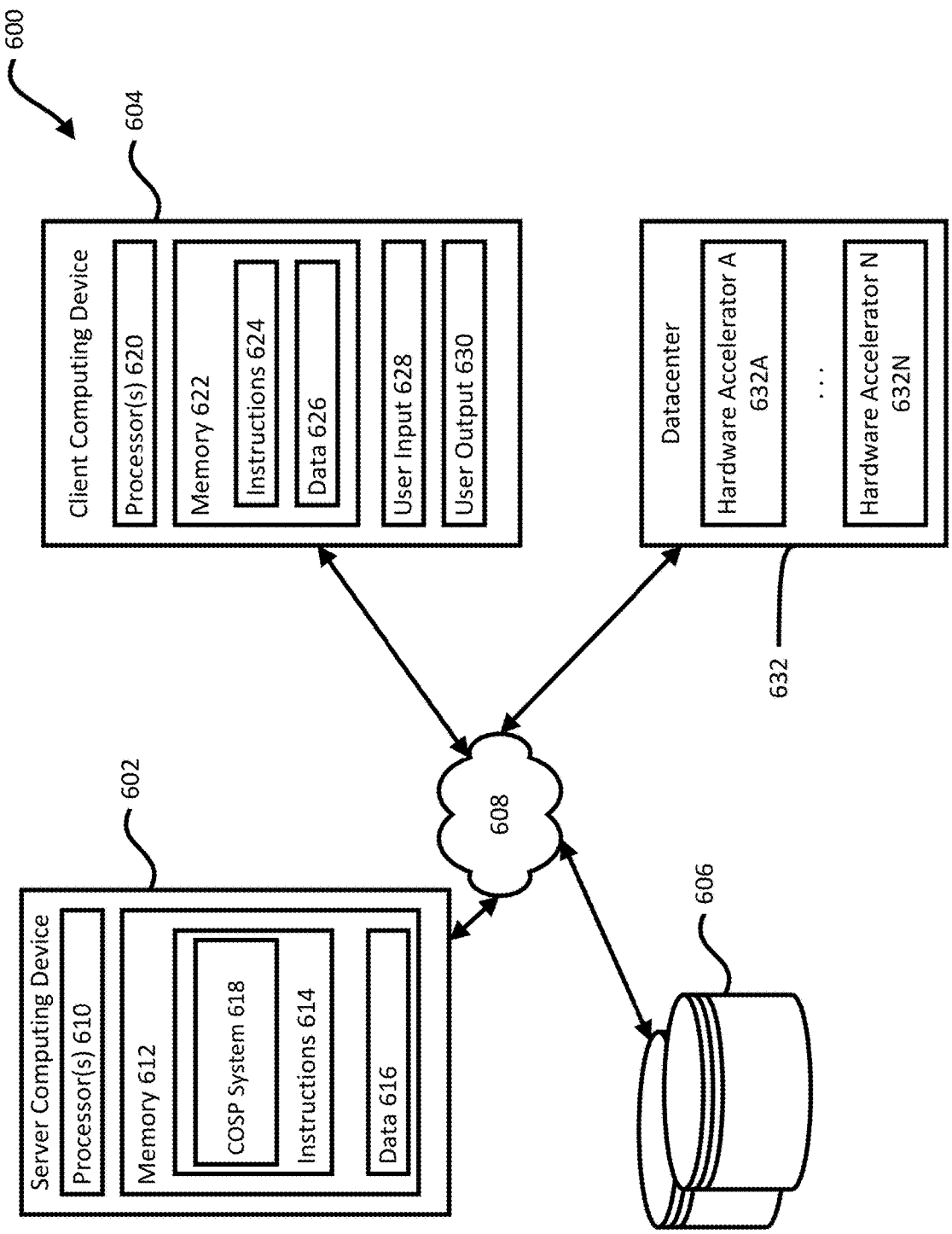
FIG. 6 depicts a block diagram of an example environment for implementing a consistency based self-adaptive prompting system according to aspects of the disclosure.

FIG. 6 depicts a block diagram of an example environment 600 for implementing a consistency based self-adaptive prompting system. The system 600 can be implemented on one or more devices having one or more processors in one or more locations, such as in server computing device 602. Client computing device 604 and the server computing device 602 can be communicatively coupled to one or more storage devices 606 over a network 608. The storage devices 606 can be a combination of volatile and non-volatile memory and can be at the same or different physical locations than the computing devices 602, 604. For example, the storage devices 606 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 602 can include one or more processors 610 and memory 612. The memory 612 can store information accessible by the processors 610, including instructions 614 that can be executed by the processors 610. The memory 612 can also include data 616 that can be retrieved, manipulated, or stored by the processors 610. The memory 612 can be a type of non-transitory computer readable medium capable of storing information accessible by the processors 610, such as volatile and non-volatile memory. The processors 610 can include one or more central processing units (CPUs), graphic processing units (GPUs), field-programmable gate arrays (FPGAs), and/or application-specific integrated circuits (ASICs), such as tensor processing units (TPUs).

The instructions 614 can include one or more instructions that, when executed by the processors 610, cause the one or more processors to perform actions defined by the instructions 614. The instructions 614 can be stored in object code format for direct processing by the processors 610, or in other formats including interpretable scripts or collections of independent source code modules that are interpreted on demand or compiled in advance. The instructions 614 can include instructions for implementing a consistency based self-adaptive prompting (COSP) system 618, which can correspond to the COSP system 400, 500 of FIGS. 4-5. The COSP system 618 can be executed using the processors 610, and/or using other processors remotely located from the server computing device 602.

The data 616 can be retrieved, stored, or modified by the processors 610 in accordance with the instructions 614. The data 616 can be stored in computer registers, in a relational or non-relational database as a table having a plurality of different fields and records, or as JSON, YAML, proto, or XML documents. The data 616 can also be formatted in a computer-readable format such as, but not limited to, binary values, ASCII, or Unicode. Moreover, the data 616 can include information sufficient to identify relevant information, such as numbers, descriptive text, proprietary codes, pointers, references to data stored in other memories, including other network locations, or information that is used by a function to calculate relevant data.

The client computing device 604 can also be configured similarly to the server computing device 602, with one or more processors 620, memory 622, instructions 624, and data 626. The client computing device 604 can also include a user input 628 and a user output 630. The user input 628 can include any appropriate mechanism or technique for receiving input from a user, such as keyboard, mouse, mechanical actuators, soft actuators, touchscreens, microphones, and sensors.

The server computing device 602 can be configured to transmit data to the client computing device 604, and the client computing device 604 can be configured to display at least a portion of the received data on a display implemented as part of the user output 630. The user output 630 can also be used for displaying an interface between the client computing device 604 and the server computing device 602. The user output 630 can alternatively or additionally include one or more speakers, transducers or other audio outputs, a haptic interface or other tactile feedback that provides non-visual and non-audible information to the platform user of the client computing device 604.

Although FIG. 6 illustrates the processors 610, 620 and the memories 612, 622 as being within the computing devices 602, 604, components described herein can include multiple processors and memories that can operate in different physical locations and not within the same computing device. For example, some of the instructions 614, 624 and the data 616, 626 can be stored on a removable SD card and others within a read-only computer chip. Some or all of the instructions and data can be stored in a location physically remote from, yet still accessible by, the processors 610, 620. Similarly, the processors 610, 620 can include a collection of processors that can perform concurrent and/or sequential operation. The computing devices 602, 604 can each include one or more internal clocks providing timing information, which can be used for time measurement for operations and programs run by the computing devices 602, 604.

The server computing device 602 can be connected over the network 608 to a datacenter 632 housing any number of hardware accelerators 632A-N. The datacenter 632 can be one of multiple datacenters or other facilities in which various types of computing devices, such as hardware accelerators, are located. Computing resources housed in the datacenter 632 can be specified for deploying large language models (LLMs), such as for natural language processing, as described herein.

The server computing device 602 can be configured to receive requests to process data from the client computing device 604 on computing resources in the datacenter 632. For example, the environment 600 can be part of a computing platform configured to provide a variety of services to users, through various user interfaces and/or application programming interfaces (APIs) exposing the platform services. The variety of services can include generating one or more LLMs. The client computing device 604 can transmit data specifying queries. The COSP system 618 can receive the data specifying the queries, and in response, generate output data including a predicted answer.

As other examples of potential services provided by a platform implementing the environment 600, the server computing device 602 can maintain a variety of LLMs available at the datacenter 632. For example, the server computing device 602 can maintain different families for deploying LLMs on the various types of TPUs and/or GPUs housed in the datacenter 232 or otherwise available for processing.

Figure 7:
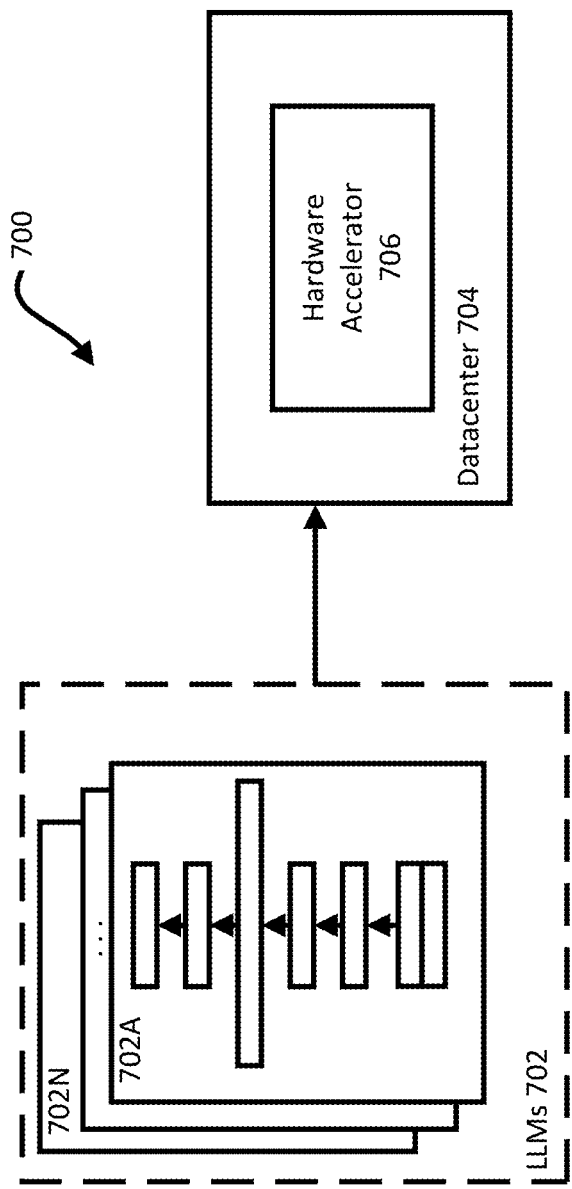
FIG. 7 depicts a block diagram illustrating one or more LLM architectures according to aspects of the disclosure.

FIG. 7 depicts a block diagram 700 illustrating one or more LLM architectures 702, more specifically 702A-N for each architecture, for deployment in a datacenter 704 housing a hardware accelerator 706 on which the deployed LLMs 702 will execute, such as for providing natural language processing. The hardware accelerator 706 can be any type of processor, such as a CPU, GPU, FPGA, or ASIC such as a TPU.

An architecture 702 of a LLM can refer to characteristics defining the LLM, such as characteristics of layers for the LLM, how the layers process input, or how the layers interact with one another. The architecture 702 of the LLM can also define types of operations performed within each layer. One or more LLM architectures 702 can be generated that can output results, such as for natural language processing. Example LLM architectures 702 can correspond to pathway language models, such as PaLM-62B, PaLM-540B, or GPT-3.

Referring back to FIG. 6, the devices 602, 604 and the datacenter 632 can be capable of direct and indirect communication over the network 608. For example, using a network socket, the client computing device 604 can connect to a service operating in the datacenter 632 through an Internet protocol. The devices 602, 604 can set up listening sockets that may accept an initiating connection for sending and receiving information. The network 608 itself can include various configurations and protocols including the Internet, World Wide Web, intranets, virtual private networks, wide area networks, local networks, and private networks using communication protocols proprietary to one or more companies. The network 608 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. The network 608, in addition or alternatively, can also support wired connections between the devices 602, 604 and the datacenter 632, including over various types of Ethernet connection.

Although a single server computing device 602, client computing device 604, and datacenter 632 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing LLMs, and any combination thereof.

Figure 8:
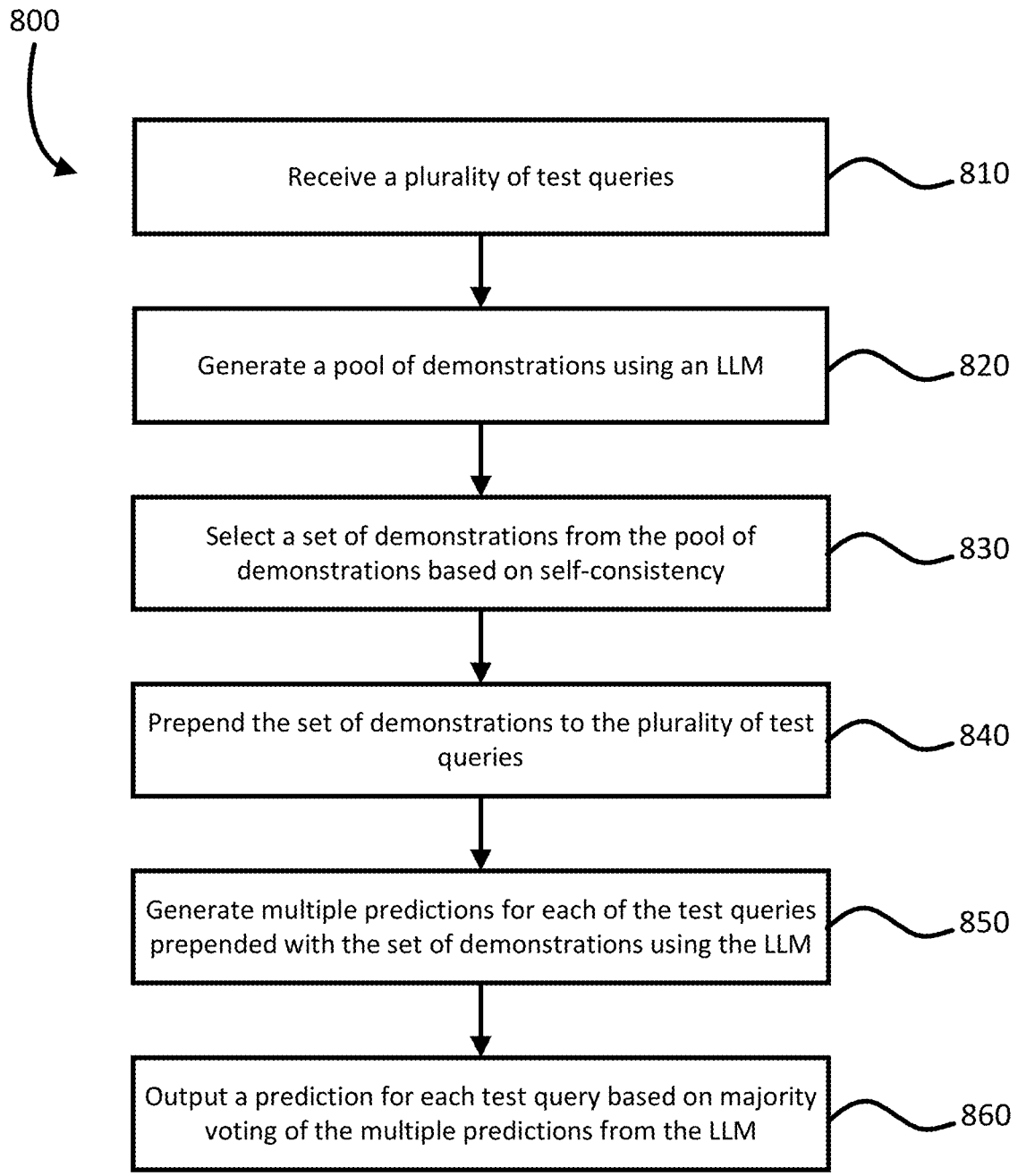
FIG. 8 depicts a flow diagram of an example process for consistency based self-adaptive prompting according to aspects of the disclosure.

FIG. 8 depicts a flow diagram of an example process 800 for consistency based self-adaptive prompting. The example process 800 can be performed on a system of one or more processors in one or more locations, such as the COSP system 400/500 of FIGS. 4-5.

As shown in block 810, the COSP system receives a plurality of test queries. The test queries can each have concatenated a trigger phrase, e.g., let's think step by step, or a labeled demonstration, e.g., rationale and prediction.

As shown in block 820, the COSP system generates a pool of demonstrations using the LLM. The pool of demonstrations can be generated by running Zero-shot CoT or Few-shot CoT over the plurality of test queries. The LLM can be queried multiple times to generate multiple reasoning paths and potentially different predictions. The pool of demonstrations can include the multiple reasoning paths and potentially different predictions for each test query.

As shown in block 830, the COSP system selects a set of demonstrations from the generated pool of demonstrations based on self-consistency. For each test query, the COSP system can compute a majority vote prediction from the generated predictions and retain only the reasoning paths that lead to a majority vote prediction. The remaining reasoning path-prediction pairs can be pruned from the pool of demonstrations. The COSP system can compute a majority vote prediction based on entropy and repetitiveness.

As shown in block 840, the COSP system concatenates the selected set of demonstrations to the plurality of test queries. The COSP system can adaptively allocate a number of demonstrations per test query that is proportional to its zero-shot entropy, with higher entropy test queries given more demonstrations.

As shown in block 850, the COSP system generates multiple predictions for each of the test queries concatenated with the set of demonstrations by querying using the LLM. The COSP system can query the LLM multiple times to generate the multiple predictions.

As shown in block 860, the COSP system selects and/or outputs a final prediction for each test query based on majority voting of the predictions from querying the LLM. The final prediction can be an answer to the test query.

As an example, consider the following arithmetic and logical reasoning tasks. 3 LLMs can be run: PaLM with 62 billion parameters (PaLM-62B), PaLM with 540 billion parameters (PaLM-540B), and GPT-3 with 175 billion parameters. Results on PaLM-62B, PaLM-540B, and GPT-3 are shown in the tables in FIGS. 9-10. In all example cases, COSP delivers improvements, with particularly large gains seen on PaLM-62B and GPT-3, achieving 10-15% average improvement over baselines. Even though COSP operates under a more challenging setup without ground-truth labels, COSP performs on par or better than Few-shot CoT in almost all tasks that use labels. The large gains seen in the smaller models that significantly reduced their performance gap to the large models, e.g., PaLM-540B, can be particularly practically impactful, given the former's strong advantages in computational costs and general accessibility. Furthermore, COSP was found to be robust by consistently improving over the zero-shot CoT baseline. By using self-consistency as a proxy of correctness, in most cases COSP is capable of identifying outputs with sound reasoning as in-context examples even when the task is challenging to the LLM under the zero-shot setup.

As such, generally disclosed herein are implementations for COSP, a prompting framework that improves zero-shot reasoning abilities of LLMs. COSP can achieve this by selecting in-context demonstrations from its own outputs using a scoring function that incorporates consistency, diversity, and repetitiveness. Across multiple LLMs and tasks requiring complex reassigning, COSP demonstrates improvements in performance and resource management.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems. One or more processors in one or more locations implementing an example COSP system according to aspects of the disclosure can perform the operations shown in the drawings and recited in the claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for consistency based self-adaptive prompting, comprising:
generating, by one or more processors, a pool of demonstrations using a large language model (LLM) for a plurality of test queries by running chain-of-thought (CoT) over the plurality of test queries;
determining, by the one or more processors, a self-consistency score for respective demonstrations in the pool of demonstrations;
selecting, by the one or more processors, a set of demonstrations from the pool of demonstrations based on the self-consistency scores;
prepending, by the one or more processors, the set of demonstrations to the plurality of test queries; and
generating, by the one or more processors, a plurality of predictions based on the test queries prepended with the set of demonstrations using the LLM.

2. The method of claim 1, further comprising receiving, by the one or more processors, the plurality of test queries, each test query being concatenated with a trigger phrase or a labeled demonstration.

3. The method of claim 1, wherein the CoT comprises Zero-shot CoT or Few-shot CoT.

4. The method of claim 1, wherein the CoT is run multiple times using the LLM to generate multiple reasoning paths and different predictions for each test query.

5. The method of claim 1, wherein selecting a set of demonstrations further comprises computing a majority vote prediction and retaining only reasoning paths that result in a majority vote prediction.

6. The method of claim 5, wherein the majority vote prediction is computed based on entropy and repetitiveness.

7. The method of claim 1, wherein prepending the set of demonstrations further comprises adaptively allocating a number of demonstrations per test query that is proportional to an entropy of the test query.

8. The method of claim 1, wherein generating the plurality of predictions further comprises querying the test queries prepended with the set of demonstrations multiple times using the LLM to generate multiple predictions for each test query.

9. The method of claim 8, further comprising:
selecting, by the one or more processors, a prediction of the multiple predictions for each test query based on a majority voting; and
outputting, by the one or more processors, the selected prediction for each test query.

10. A system comprising:
one or more processors; and
one or more storage devices coupled to the one or more processors and storing instructions that, when executed by the one or more processors, cause the one or more processors to perform operations for consistency based self-adaptive prompting, the operations comprising:
generating a pool of demonstrations using a large language model (LLM) for a plurality of test queries by running chain-of-thought (CoT) over the plurality of test queries;
determining a self-consistency score for respective demonstrations in the pool of demonstrations;
selecting a set of demonstrations from the pool of demonstrations based on the self-consistency scores;
prepending the set of demonstrations to the plurality of test queries; and
generating a plurality of predictions based on the test queries prepended with the set of demonstrations using the LLM.

11. The system of claim 10, wherein the CoT is run multiple times using the LLM to generate multiple reasoning paths and different predictions for each test query.

12. The system of claim 10, wherein selecting a set of demonstrations further comprises computing a majority vote prediction and retaining only reasoning paths that result in a majority vote prediction, the majority vote prediction being computed based on entropy and repetitiveness.

13. The system of claim 10, wherein generating the plurality of predictions further comprises querying the test queries prepended with the set of demonstrations multiple times using the LLM to generate multiple predictions for each test query.

14. The system of claim 13, wherein the operations further comprise selecting a prediction of the multiple predictions for each test query based on a majority voting.

15. A non-transitory computer readable medium for storing instructions that, when executed by one or more processors, cause the one or more processors to perform operations for consistency based self-adaptive prompting, the operations comprising:
generating a pool of demonstrations using a large language model (LLM) for a plurality of test queries by running chain-of-thought (CoT) over the plurality of test queries;
determining a self-consistency score for respective demonstrations in the pool of demonstrations;
selecting a set of demonstrations from the pool of demonstrations based on the self-consistency scores;
prepending the set of demonstrations to the plurality of test queries; and
generating a plurality of predictions based on the test queries prepended with the set of demonstrations using the LLM.

16. The non-transitory computer readable medium of claim 15, wherein the CoT is run multiple times using the LLM to generate multiple reasoning paths and different predictions for each test query.

17. The non-transitory computer readable medium of claim 15, wherein selecting a set of demonstrations further comprises computing a majority vote prediction and retaining only reasoning paths that result in a majority vote prediction, the majority vote prediction being computed based on entropy and repetitiveness.

18. The non-transitory computer readable medium of claim 15, wherein generating the plurality of predictions further comprises querying the test queries prepended with the set of demonstrations multiple times using the LLM to generate multiple predictions for each test query.

19. The non-transitory computer readable medium of claim 18, wherein the operations further comprise selecting a prediction of the multiple predictions for each test query based on a majority voting.

\* \* \* \* \*